April 10, 1962 A. SCOTTI 3,028,812
HYDRAULIC MECHANICAL DEVICE FOR TIGHTENING
TUBULAR ELASTIC ELEMENTS
Filed March 1, 1960
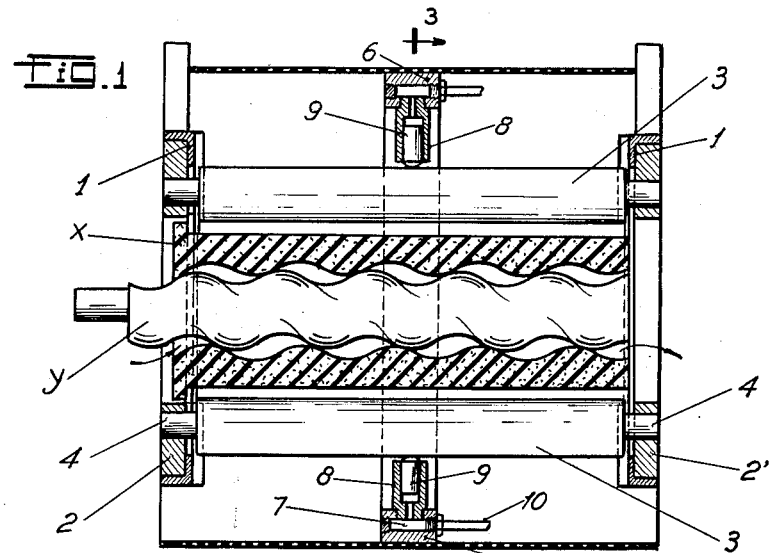
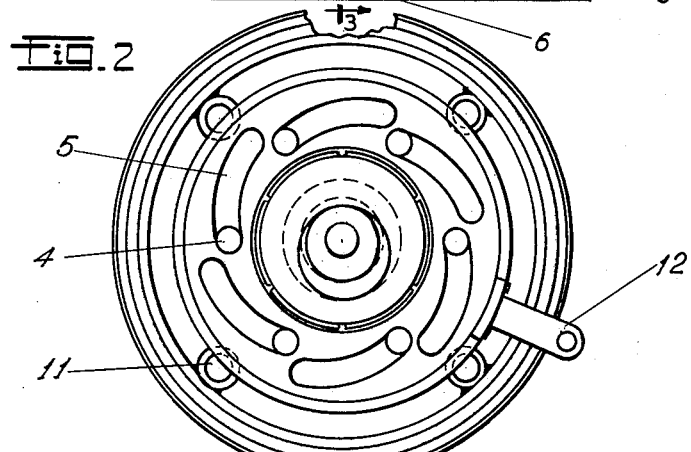
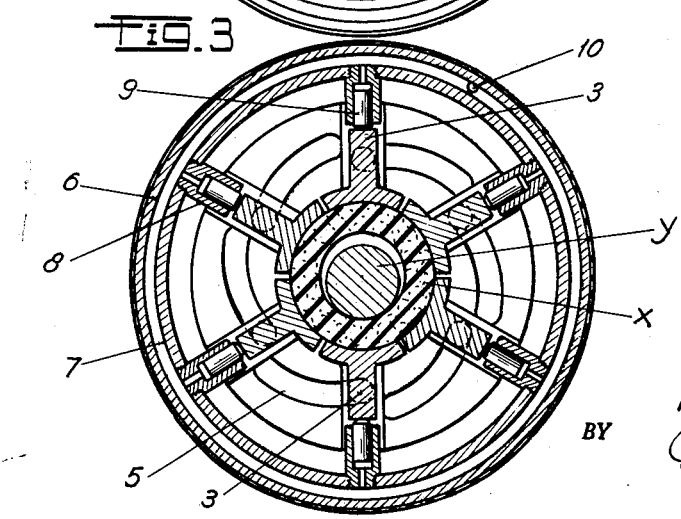
INVENTOR.
AMBROGIO SCOTTI
BY
ATTORNEY.

United States Patent Office 3,028,812
Patented Apr. 10, 1962

3,028,812
HYDRAULIC MECHANICAL DEVICE FOR TIGHTENING TUBULAR ELASTIC ELEMENTS
Ambrogio Scotti, Via Steppani, Monza, Milan, Italy
Filed Mar. 1, 1960, Ser. No. 12,145
2 Claims. (Cl. 103—117)

The present invention relates to a hydraulic mechanical device for tightening tubular elastic elements.

The use of rubber was introduced some years ago as an effective substitute for mechanical parts or even complete machines, such as couplings, pneumatic housings, special extrusion pump housings for acid or caustic paste-like materials, etc., which presented drawbacks if made of metal. As a consequence of this innovation, manufacturers had to cope with the problem of tightness, such as for example, in the case of junctions for large diameter pipes in the electrical industry, in the confectionery industry, in the chemical and pharmaceutical industry and in the case of other couplings where the parts must remain in a fixed operating position. In the case of screw machines and particularly in rotating pumps and other devices used for moving sandy and corrosive paste-like substances (whose transportation implies a very high degree of wear of the contact surfaces), the problem of taking up the slack between the fixed and the moving parts after a given operating period is particularly complex.

It is one object of the present invention to provide a hydraulic mechanical device for tightening tubular elastic elements wherein the tightening required is obtained by giving rubber greater strength while still maintaining its elasticity. The present invention also permits of complete and constant adhesion between the different parts by taking up the slack caused by wear.

The system most widely used consists of conical concentric rings which compress the rubber elements by exerting purely mechanical axial stresses through a system of locking rods. As will be easily appreciated, these stresses are largely uncontrolled. If, moreover, the apparatus is handled by non-technical personnel, as it is done on general construction sites, adjustment is only carried out very roughly and it is easily understood that a satisfactory tightening will not be reached with the required accuracy. Machines can thus be put out of action, due to unnecessary breakages, and may, in some cases, not be repaired on the spot.

The mechanical solution of tightening cones is not reversible, that is, it is not possible to tighten and loosen: it is readily appreciated that this is of the greatest importance for adapting the working conditions to the working requirements (necessary interruptions, stoppages, etc.). The system is therefore extremely critical for the practical use of machinery and its satisfactory adjustment. The present invention eliminates these drawbacks.

It is still another object of the present invention to provide a hydraulic mechanical device for tightening tubular elastic elements, wherein it is possible to adjust the pressure correctly and according to the requirements of the particular applications of individual machinery. The pressure adjustment is carried out by means of a spring action (hydraulic pump by example) and it can therefore be carried out with extreme accuracy, not by a mechanical effort but by the simple operation of a small lever or pedal whereby pressure is applied to the working surfaces as described below. The correct pressure in relation to the surfaces concerned is shown on a suitable instrument.

With these and other objects in view, which will become apparent in the following detailed description, the present invention will be clearly understood in connection with the accompanying drawings, in which:

FIGURE 1 is an axial section of the present device in an application to an ordinary pump, by example;

FIG. 2 is an end view of the device; and

FIG. 3 is a section along the lines 3—3 of FIG. 1.

Referring now to the drawing, the enclosed FIG. 1 shows a section of the device applied to the case of an ordinary pump. Two flanges 1 constitute the support of the platforms 2 and 2'. The latter support in turn a plurality of pressure elements 3, in the present case six, to which the appendices 4, which move in the sector slots 5 are attached. The pressure elements 3 are operated by pistons 9 which reciprocate in cylinders 8. The cylinder jacket is formed integrally with a circular ring 6 defining a chamber 7 to which pressure is transmitted by a line 10 from a suitable lifting jack. The platforms 2 and 2' are connected mechanically by means of four rods (not shown in FIG. 2) passing through the bores 11 provided in the platforms 2 and 2' themselves.

The pressure elements 3 are mounted on the periphery of an internally helically threaded stator X of rubber in which an externally helically threaded rotor Y is rotatably disposed.

A lever 12, which operates the individual platforms, is disclosed in FIG. 2. These platforms 2 and 2' move the appendices 4 of the pressure elements 3 on the seats of the slots 5. The lever 12 can be locked in any required position by any conventional means.

The operation of the present device is easily understood, since the hydraulic pressure in the chamber 7 is transmitted to the pistons 9 by the circular ring 6. In turn the latter operate the pressure elements 3, thus tightening the rubber stator X (FIG. 1) or taking up any slack of the rotor Y.

The description and illustration shown in the drawing is only an example of one of the embodiments of the present invention. A plurality of variations can be provided such as, for example, making a plurality of air vents 10 (FIG. 3) opposite the operating position of each piston 9. More than one piston can also be attached to the sectors 5 and a plurality of teeth can be cut on the appendices 4, so that the required tightness as obtained by the operation of the lever 12 can be maintained, the scope of the present invention being determined by the objects and the claims.

I claim:

1. In a hydraulic mechanical device for tightening tubular elastic elements, a rigid rotor and a stator of rubber surrounding said rotor, a plurality of pressure elements disposed in star-like arrangement on the outer surface of said stator, a platform at each end of said stator and having a plurality of non-concentric slots receiving the respective ends of said pressure elements, means for turning said platforms upon the axis of said rotor for tight engagement of said pressure elements on the outer periphery of said stator, and hydraulic means for pressing each of said pressure elements toward said stator.

2. The device, as set forth in claim 1, wherein said hydraulic means comprises a ring member having a plurality of cylinders, one of said cylinders being coordinated to each of said pressure elements, a piston reciprocating in each of said cylinders, and a pressure line leading to each of said cylinders, in order to apply each of said pistons under hydraulic pressure to the corresponding of said pressure elements.

(References on following page)

References Cited in the file of this patent

UNITED STATES PATENTS

| | | |
|---|---|---|
| 1,982,027 | Sieper | Nov. 27, 1934 |
| 2,504,230 | Smith | Apr. 18, 1950 |
| 2,691,347 | Zimmer | Oct. 12, 1954 |
| 2,733,854 | Chang | Feb. 7, 1956 |
| 2,796,029 | Bourke | June 18, 1957 |
| 2,937,031 | Ilune | June 3, 1958 |
| 2,874,643 | Bourke | Feb. 24, 1959 |

FOREIGN PATENTS

| | | |
|---|---|---|
| 164,551 | Sweden | Sept. 2, 1958 |
| 446,291 | Great Britain | Apr. 27, 1936 |
| 799,996 | Great Britain | Aug. 13, 1958 |